United States Patent [19]

Boccon-Gibod

[11] Patent Number: 5,797,032
[45] Date of Patent: Aug. 18, 1998

[54] BUS FOR CONNECTING EXTENSION CARDS TO A DATA PROCESSING SYSTEM AND TEST METHOD

[75] Inventor: Philippe Boccon-Gibod, Eybens, France

[73] Assignee: Hewlett-Packard Company, Palo Alto, Calif.

[21] Appl. No.: 16,218

[22] Filed: Feb. 11, 1993

[30] Foreign Application Priority Data

Feb. 13, 1992 [FR] France .................. 92 01849

[51] Int. Cl.⁶ .................................. G06F 13/00
[52] U.S. Cl. .................. 395/829; 395/800; 395/828; 364/230.4; 364/236.2; 364/240.2; 364/241; 364/247; 364/259.1
[58] Field of Search ............. 364/230.4, 236.2, 364/240.2, 247, 259.1, 241; 395/800, 829, 828

[56] References Cited

U.S. PATENT DOCUMENTS

| | | |
|---|---|---|
| 4,321,667 | 3/1982 | Robbins et al. |
| 4,999,805 | 3/1991 | Culley et al. ........................ 364/900 |
| 5,038,320 | 8/1991 | Heath et al. ........................ 364/900 |
| 5,109,517 | 4/1992 | Houda et al. ....................... 395/800 |
| 5,111,423 | 5/1992 | Kopec, Jr. et al. ................. 395/500 |
| 5,138,706 | 8/1992 | Molo et al. ......................... 395/500 |
| 5,237,690 | 8/1993 | Bealkowski et al. ............... 395/700 |
| 5,257,387 | 10/1993 | Richek et al. .................... 395/800 |
| 5,263,148 | 11/1993 | Jones, Jr. et al. ................. 395/500 |
| 5,353,432 | 10/1994 | Richek et al. .................... 395/500 |
| 5,450,570 | 9/1995 | Richek et al. .................... 395/500 |
| 5,491,804 | 2/1996 | Heath et al. ...................... 395/275 |

FOREIGN PATENT DOCUMENTS 0 431 688  6/1991  European Pat. Off. .
0 465 079  1/1992  European Pat. Off. .

OTHER PUBLICATIONS

Hamacher et al; *Computer Organziation* (2ⁿᵈ Ed), McGraw-Hill Inc, 1984 pp. 203–220.

*Primary Examiner*—Jack B. Harvey
*Assistant Examiner*—Valerie A. Darbe

[57] ABSTRACT

A data processing system including a bus (ISA, EISA), in which address lines (SA) and data lines (SD) are connected in parallel to a series of slots for receiving, each, any one of a plurality of available extension cards. Control lines of the bus are connected in parallel to the slots, except at least one specific control line (AEN, SMEMR#) operable to enable a slot by rendering accessible, through the bus, the circuits of a card inserted in the slot. The data processing system further includes means (A, S, 30) programmable through the bus for transmitting the state of the specific control line to predetermined slots.

6 Claims, 3 Drawing Sheets

BUS FOR CONNECTING EXTENSION CARDS TO A DATA PROCESSING SYSTEM AND TEST METHOD

BACKGROUND OF THE INVENTION

1. Field of the Invention

The present invention relates to a computer system bus having parallel connected slots, in which extension cards are to be inserted. The invention more particularly relates to an Industry Standard Architecture (ISA) bus.

2. Discussion of the Related Art

FIG. 1 schematically shows an ISA bus having parallel connected slots $SL_1$, $SL_2$, ... $SL_n$. The ISA bus includes a plurality of lines amongst which are shown data lines SD, address lines SA and LA, write selection lines IOW#, SMEMW#, MEMW#, read selection lines IOR#, SMEMR#, MEMR#, an AEN line for inhibiting peripheral devices, a line MASTER# for taking control of the bus, and a line RESETDRV for resetting the extension cards.

All these lines are coupled to a central processing unit (CPU) except line RESETDRV which is controlled by a circuit 10. Circuit 10 resets the cards upon powering on and, if required, at the end of a testing step of the cards. Symbol "#" means that the line is active when it is at the logic state "0". The functions of these lines will be described later whenever their description is useful for understanding the invention. A more detailed description of the functions of these lines, as well as others (not shown) are described in literature relating to the ISA standard.

In many computer systems using the ISA bus, such as some microcomputers, the address lines SA allow to access two types of elements, i.e., a system memory (including memory that may be provided on extension cards), and peripheral devices accessible by input/output (I/O) ports, also liable to include memory.

The first megabyte (1 Mb) block of the system memory is addressable by 20 address lines $SA_0$–$SA_{19}$ and the selection of its read/write mode is determined by lines SMEMR# and SMEMW#. Lines SMEM are unidirectional, that is, their state is fixed by a single element, the CPU in the present case. To address the system memory beyond 1 Mb, additional address lines $LA_{17}$–$LA_{23}$ are used. Lines MEMR# and MEMW# determine the selection of the read/write mode of the system memory beyond 1 Mb. These lines MEM are bidirectional, that is, their state can be fixed by several elements, here, the extension cards or the CPU.

The ten lines $SA_0$–$SA_9$, which convey values ranging from 000 h to 3 FFh (h indicating that the numbers are hexadecimal), also allow to address the peripheral devices. In that case, to differentiate a peripheral device access from a system memory access, lines IOW# and IOR# are used instead of lines SMEM or MEM. These lines IO are also bidirectional.

The states of the bidirectional lines MEM and IO can be fixed by a so-called ISA master extension card. To become master, such an extension card enables the above mentioned line MASTER# before enabling lines MEM or IO.

In order to address a peripheral device, the above mentioned line AEN must be "0"; the write or read mode is obtained by setting to 0 line IOW# or IOR#, respectively. Line AEN is unidirectional and its state is determined by the CPU. In order to address the system memory, the state of line AEN is ignored and the write or read mode is obtained by setting to 0 one of the lines SMEMW# and MEMW#, or one of the lines SMEMR# and MEMR#, respectively. Line AEN serves to differentiate a peripheral device access from an access to a Direct Memory Access (DMA) device. When a DMA device is accessed, lines IOW# and IOR# are also used, but line AEN is set to 1. As for line AEN, only accesses to the peripheral devices are of interest in the following description, but it should be reminded that state 1 of line AEN causes the inhibition of the peripheral devices.

Hereinafter, "input/output address" will be construed as an address issued when a peripheral device (AEN=0 and IOW# or IOR#=0) is accessed, and "system address" as an address issued when the system memory (SMEMR#, SMEMW#, MEMR# or MEMW#=0) is accessed.

Because of the parallel connection of cards on the ISA bus, it is essential, in read mode, that several cards do not simultaneously respond to an address by providing data on the data lines SD, which would generate a data collision on these lines liable to cause erroneous reading of the presented data, and even to damage the output amplifiers of the cards. For an ISA bus to suitably operate, all the connected cards must respond to different specific (input/output and system) addresses.

However, it may happen that cards responding to same addresses are installed. For example, a user may want to add on an ISA bus a second serial communication card, a first such card being already conventionally installed. If the user forgets to indicate to the second serial card to which addresses it has to respond (which is generally done by setting jumpers on the card), the second card is very likely to have the same configuration as the first one. In that case, when the user accesses in read mode his first serial card, the second card will also respond, and both cards will present data simultaneously on the data lines SD. This case can frequently occur when an unskilled user wishes to extend his computer's capacities by adding extension cards.

The ISA bus allows the determination of the nature of the connected extension cards. Conventionally, to achieve this purpose, the input/output and system addresses likely to be used by the cards are issued and it is observed to which addresses responses occur on the data lines. It is known that common cards, such as video cards, serial communication cards, disk controller cards, and so forth, respond to specific standardized addresses. However, it is impossible to determine in which slot a determined card is located. This drawback is particularly disturbing if a great number of cards are installed because the user will not be able to differentiate the cards and will not know where to connect the devices associated with the different cards.

FIG. 2 schematically shows a more recent bus configuration meeting the Enhanced-ISA (EISA) standards, solving the problem of locating the cards. The EISA bus is supposed to be compatible with the ISA bus and includes a large number of additional lines. FIG. 2 more particularly shows the 32 data lines $D_0$–$D_{31}$ and 32 latched address lines $LA_0$–$LA_{31}$ enhancing lines SD and SA of the ISA bus. Here, the slots are referenced $SLE_1$, $SLE_2$, ... $SLE_x$. To each slot is associated a specific peripheral device inhibiting line $AEN_1$, $AEN_2$, ... $AEN_x$ connected to the output of an address decoder 20. The address decoder 20 fixes the states of lines $AEN_1$ ... $AEN_x$ as a function of the states of the address lines $LA_8$–$LA_{15}$ and of the ISA-line AEN.

Each EISA card has a dedicated memory block addressable as a peripheral device by input/output addresses higher than 3 FFh coded on twelve lines, $LA_0$–$LA_{11}$. Four additional lines, $LA_{12}$–$LA_{15}$, are used by decoder 20 to select either one of 16 EISA slots by transmitting the state of line AEN to the corresponding lines $AEN_1$ ... $AEN_x$. All slots are selected ($AEN_1 \ldots AEN_x = AEN$) when all lines $LA_{10}-LA_{15}$ are 0, which is the case when a conventional peripheral device is accessed (by ten address lines). Otherwise, lines $LA_{12}-LA_{15}$ allow to select one slot at a time to access the dedicated memory block of a card inserted in this slot. For reasons that need not be explained here, for some logic combinations of lines $LA_8$ and $LA_9$, all the slots are inhibited (that is why these lines are also decoded by decoder 20).

Thus, in a dedicated memory block of an EISA card, information concerning the card can be stored, which will be read by the system. By accessing the information in this block, the system will detect at the same time the position of the card thanks to the states of lines $LA_{12}-LA_{15}$ Of the address issued to access the block. However, the EISA bus does not allow to detect address collisions either. Moreover, it is not possible to detect the locations of the ISA cards installed in the slots.

An object of the invention is to provide a bus which is compatible with the ISA and EISA standards, allowing to detect address collisions and to avoid such collisions.

Another object of the invention is to provide such a bus further allowing to determine the respective locations of the ISA cards connected to the bus.

SUMMARY OF THE INVENTION

These objects are achieved with an ISA or EISA bus having a device controlled by a CPU for transmitting, only to the slots defined by the CPU, the states of specific control lines, the function of which is to render a component connected to the bus accessible or not.

The invention more particularly relates to a computer system including a bus in which: address lines and data lines are connected in parallel to a series of slots for receiving, each, any one of a plurality of available extension cards; control lines are connected in parallel to the slots, except at least one specific control line operable to enable a slot by rendering accessible, through the bus, the circuits of a card inserted in the slot. The system further includes means programmable through the bus for transmitting the state of at least one specific control line to predetermined slots.

According to an embodiment of the invention, at least one specific control line includes a line for inhibiting peripheral devices, and a line for selecting a memory read mode.

According to an embodiment of the invention, the programmable means include: a logic gate for each specific control line and for each slot, a first input of which is connected to the specific control line and the output of which is connected to the slot; and a register including, for each slot, an output connected to the second input of each gate associated to the slot.

According to an embodiment of the invention, at least one control line includes a bidirectional line for selecting a memory read mode. The system further includes: for each slot, a switch device which connects the slot either directly to the bidirectional line if a card in the slot enables a bus master line specific to the slot, or to the output of the logic gate associated to the bus master line; and a logic gate, having each input connected to one specific bus master line and its output connected to a general bus master line which conventionally serves to indicate that control of the bus is taken by one of the extension cards. The output takes an active state if at least one of the specific bus master lines is active.

According to an embodiment of the invention, the register is connected to the data lines and to an address decoder, in turn connected to the address lines, to a peripheral device inhibiting line, and to a peripheral device write select line, whereby the register can be accessed as a peripheral device.

The invention further provides a method for testing extension cards that may be inserted in the slots of a computer system as above described. The method comprises the following steps: (a) sequentially enabling one of the slots; (b) testing the enabled slot by performing, through the bus, a series of address issues liable to cause an extension card to respond to at least one of the addresses; (c) checking whether an enabled slot provides a response to an address to which a response from a previously tested slot has been noted; (d) if a response from a previously tested slot has been noted, marking the enabled slot; and (e) once all the slots have been tested, enabling only the non-marked slots or indicating that an address collision has occurred.

According to an embodiment of the invention, the method comprises the following steps: during step (a), writing in a register data including bits that are all identical exept one; during step (b), carrying out conventional tests for detecting a card and determining its nature, and storing the conventional information on the nature of the card as well as the address ranges to which the card responds; during step (c), checking whether these ranges overlap the ranges stored for the previously tested cards; and, during step (d), writing a datum in the memory cell corresponding to the enabled slot.

According to an embodiment of the invention, the method comprises, during step (b), the step consisting in storing a number corresponding to the enabled slot.

According to an embodiment of the invention, the register is locked during step (e) so that it can no longer be accessed in write mode subsequently.

According to an embodiment of the invention, by a predetermined action of a user during one of the steps, the stored information for the various cards as well as conventional information on the computer system is sent to a printer.

The foregoing and other objects, features, aspects and advantages of the invention will become apparent from the following detailed description of the present invention which should be read in conjunction with the accompanying drawings.

DETAILED DESCRIPTION

Figure 1:
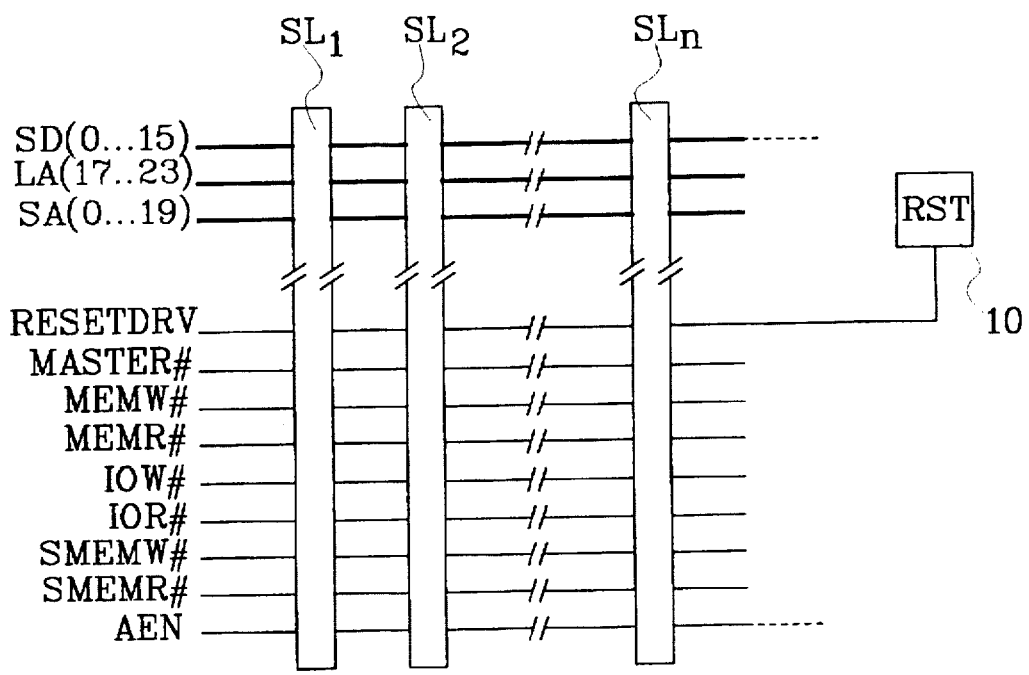
FIG. 1, above described, schematically shows a bus meeting the ISA standards, connected in parallel to several extension card slots.

FIG. 3 shows again the same components as in FIG. 1, designated with like references. According to the invention, each slot $SL_i$ ($i=1, 2, \ldots n$), instead of being connected in parallel to system memory read selection line SMEMR# and to peripheral device inhibition line AEN is connected to an inhibition line $AENI_i$ and to a selection line $SMEMR\#_i$, both specific to the slot. Line $AENI_i$ is connected to the output of an OR gate $A_i$; line $SMEMR\#_i$ is connected to the output of an OR gate $S_i$. Here, the conventional lines AEN and SMEMR# are respectively connected to a first input of each gate A and to a first input of each gate S. An enable line SEN#$_i$, specific to each slot SL$_i$, is connected to the remaining second inputs of the associated gates S$_i$ and A$_i$. The states of lines SEN# are established by a register 30.

With this configuration, if an enable line SEN#$_i$ is 1, the corresponding slot SL$_i$ is disabled as to its access in peripheral device read or write mode (AENI$_i$=1) and its access in read mode to the first 1 Mb block of the system memory (SMEMR#$_i$=1). When line SEN#$_j$ of a slot SL$_j$ is 0, the respective states of lines AEN and SMEMR# are transmitted to the slot; a card inserted in this slot then conventionally behaves with respect to the bus.

Thus, it is possible to enable or disable predetermined slots SL by writing an adequate datum in register 30. The advantage of such enabling of predetermined slots, especially one slot at a time, will be understood later on. As will be seen below, writing in register 30 is achieved through the ISA bus and can be performed by any of the devices connected to the bus, such as the CPU of the system.

Register 30 includes latches which respectively store the states of the data lines SD when the register is selected in write mode by state 0 of a line W#. The states stored in the latches are respectively provided to lines SEN#. Register 30 can also be selected in read mode by state 0 of a line R#. The state of line W# is transmitted through an OR gate 32, whose role will be understood later on, to an input selecting the write mode of register 30. Lines W# and R# are connected to an address decoder 34 receiving the address lines SA$_0$-SA$_9$, lines IOW#, IOR# for selecting the write or read mode of peripheral devices, and line AEN for inhibiting peripheral devices. With this configuration, register 30 is addressable as a peripheral device, and decoder 34 is operable to respond to a selected input/output address not yet used in the system.

Figure 3:
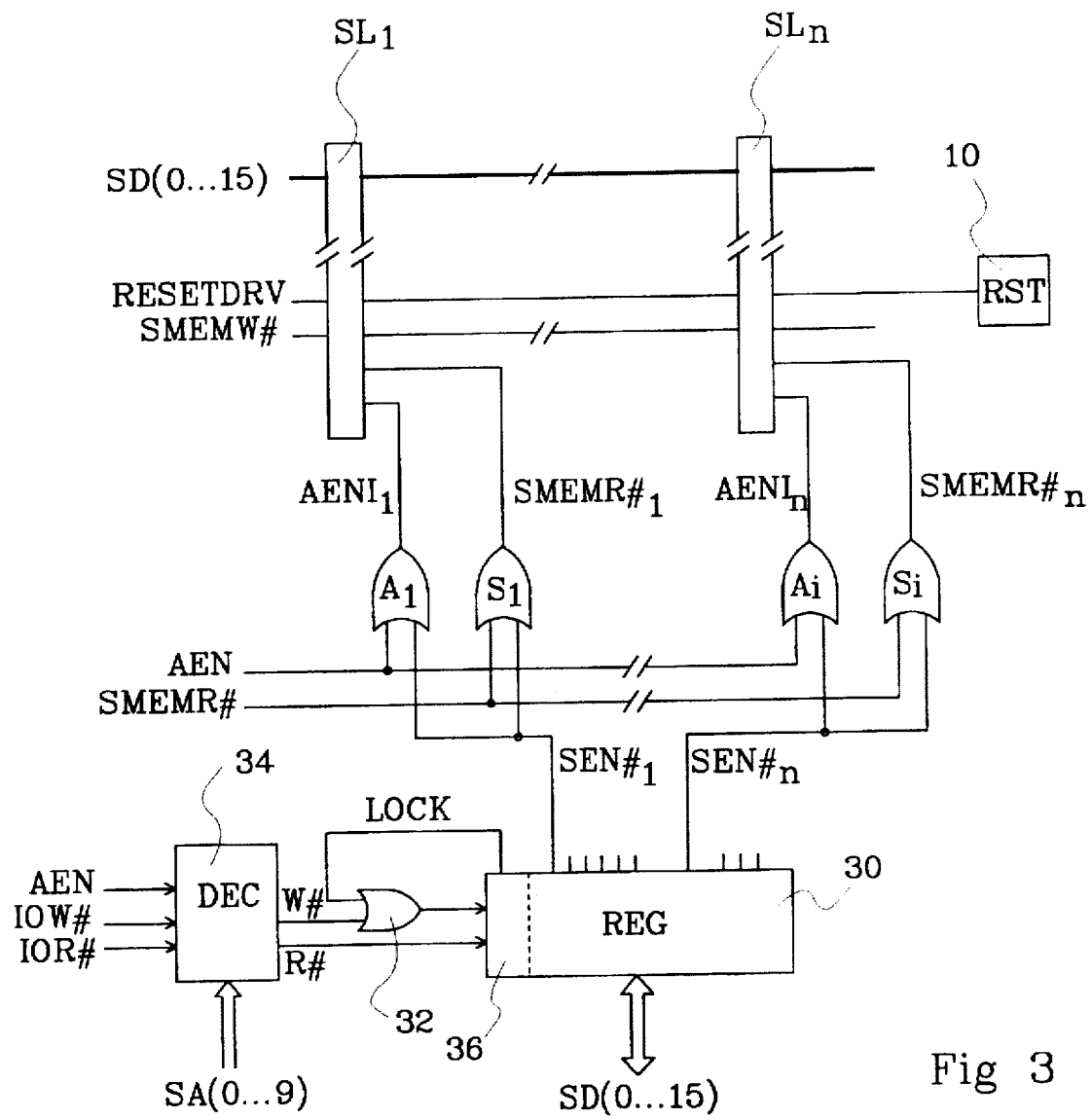
FIG. 3 schematically shows an embodiment of a bus according to the invention.

The invention allows to detect the locations of the installed extension cards as well as the possible address collisions generated by misconfigured cards, while maintaining the compatibility with the ISA standards. To achieve this purpose, during the initialization of a computer system incorporating the modified ISA bus of FIG. 3, the following steps are carried out:

writing data in register 30, which sequentially enable one of the slots SL at a time (in the example of FIG. 3, all the bits, excluding one, of the written data are set to 1);

issuing, in read mode, the input/output and system addresses that an extension card is assumed to use, carrying out conventional tests for determining the nature of the card and storing the conventional information corresponding to the nature of the card, the address ranges to which the card responds, and a number corresponding to the enabled slot;

comparing the address ranges to which this card responds with ranges stored for the preceding cards, and marking the associated slot (for example, by writing a 1 in a specific memory cell) if the card effectively responds to addresses included within a previously stored address range; and once all the slots have been tested, writing in register 30 a datum enabling only the non-marked slots (the datum being, for example, constituted by the bits stored for marking or not the slots).

Then, once these steps have been achieved, the information indicating the nature of the cards and their respective locations in the slots is stored. Also, all the cards having generated address collisions happen to be disabled, and it will be possible to indicate, for example by displaying a message on a monitor, which cards (the marked cards) have generated address collisions. Once these steps have been performed, the bus modified according to the invention behaves like a conventional ISA bus with the cards that do not generate collisions, because lines AENI$_i$ and SMEMR#$_i$ corresponding to each of these cards recover their normal connection to lines AEN and SMEMR#.

Preferably, for the computer system to recover initialized extension cards at the end of these testing steps, the cards are reset by enabling line RESETDRV. This reset can be made in some conventional systems by writing a 1 at a specific input/output address, such as 461 h. This reset is preferably performed at the end of each test of a card, so that the next card to be tested recovers the initialized state corresponding to the state of the card, upon power on.

The above mentioned test steps can be achieved by an initialization program, commonly referred to as "Power-On-Self-Test" (POST), that can be modified as required by any programmer.

Since register 30 remains accessible as a peripheral device, its content may happen to be unduly modified by a subsequent writing operation. The role of the above mentioned OR gate 32 is to avoid such drawback. A first input of the OR gate 32 is connected to line W# coming from decoder 34 and a second input receives a signal LOCK provided by an additional latch 36 included in register 30. The state of latch 36 is established by a predetermined data line SD. Thus, the last datum, written in register 30 during the above mentioned last step, includes a predetermined bit at 1 to be written in latch 36. Therefore, signal LOCK will be set to 1 and will inhibit the transmission of the state of signal W#, which avoids any further writing possibility in register 30. Of course, register 30 is conventionally reset as soon as the system is initialized.

The configuration shown in FIG. 3 allows to detect address collisions for the peripheral devices and the first 1 Mb block of the system memory. If it is desired to detect address collisions of the system memory beyond 1 Mb, line MEMR# must be processed in the same manner as line SMEMR# in FIG. 3. However, line MEMR# is bidirectional; more particularly, its state can be fixed by an extension card. A simple insertion of an OR gate between line MEMR# and the corresponding connection of a slot SL is not sufficient.

Figure 4:
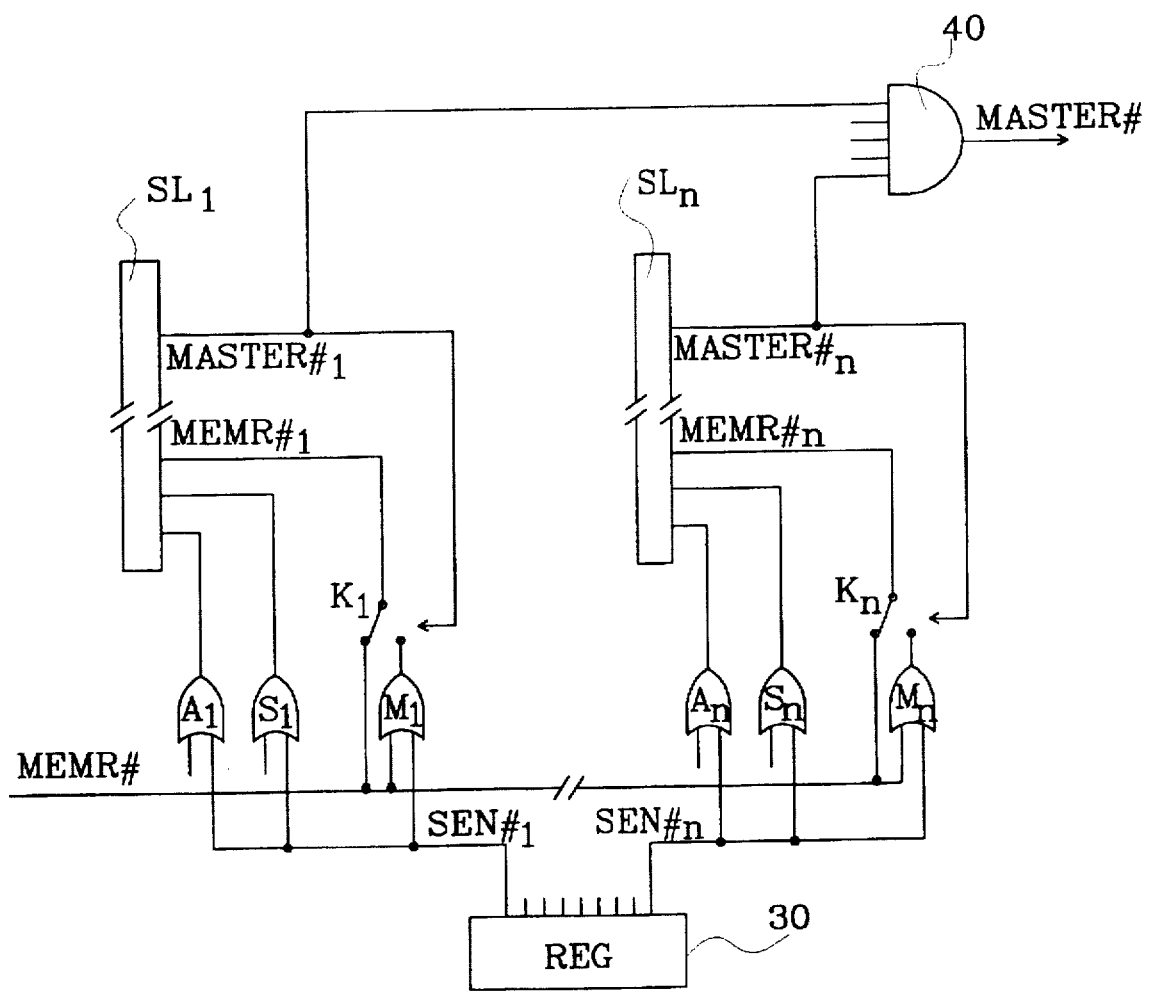
FIG. 4 schematically shows another embodiment of a bus according to the invention.

FIG. 4 partially shows the configuration of FIG. 3 to which circuits are added for allowing the detection of system memory address collisions beyond 1 Mb, while maintaining the compatibility with ISA or EISA buses.

Each slot SL$_i$, instead of being connected in parallel to bus master line MASTER# and to line MEMR# intended to select the read mode of the system memory beyond 1 Mb, is connected to a control line MASTER#$_i$ and to a selection line MEMR#$_i$ both specific to the slot. Each line MASTER#$_i$ is connected to a first input of an AND gate 40 whose output is connected to the conventional line MASTER#. Each line MEMR#$_i$ is connected to a switch device K$_i$ controlled by line MASTER#$_i$ of the same slot.

When line MASTER#$_i$ is inactive (at 1), line MEMR#$_i$ is switched to the output of an OR gate M$_i$, a first input of which is connected to the conventional line MEMR# and a second input to line SEN#$_i$ which simultaneously controls the OR gates A$_i$ and S$_i$ of FIG. 3. When line MASTER#$_i$ is active (at 0), line MEMR#$_i$ is switched directly to the conventional line MEMR#.

Under normal conditions, during the test steps, a card should not take control of the bus and each line MASTER#$_i$ remains inactive. Then, the conventional line MASTER# is inactive and each line MEMR#$_i$ is connected to the OR gate M$_i$ according to the same configuration as lines AENI$_i$ and SMEMR#$_i$ and OR gates A$_i$ and S$_i$. Thus, during the test steps, as for the first 1 Mb block of the system memory, it is also possible to check whether there are address collisions beyond 1 Mb for the system memory.

During normal operation after the test steps, if an extension card in a slot SL$_j$ enables its line MASTER#$_j$ in order to become master, the switch device K$_j$ is switched and the state of line MEMR#$_j$ (fixed in this case by the card in slot SL$_j$) is transmitted to the conventional line MEMR#. Moreover, the state of line MASTER#$_j$ is transmitted to the conventional line MASTER# through AND gate 40.

Figure 2:
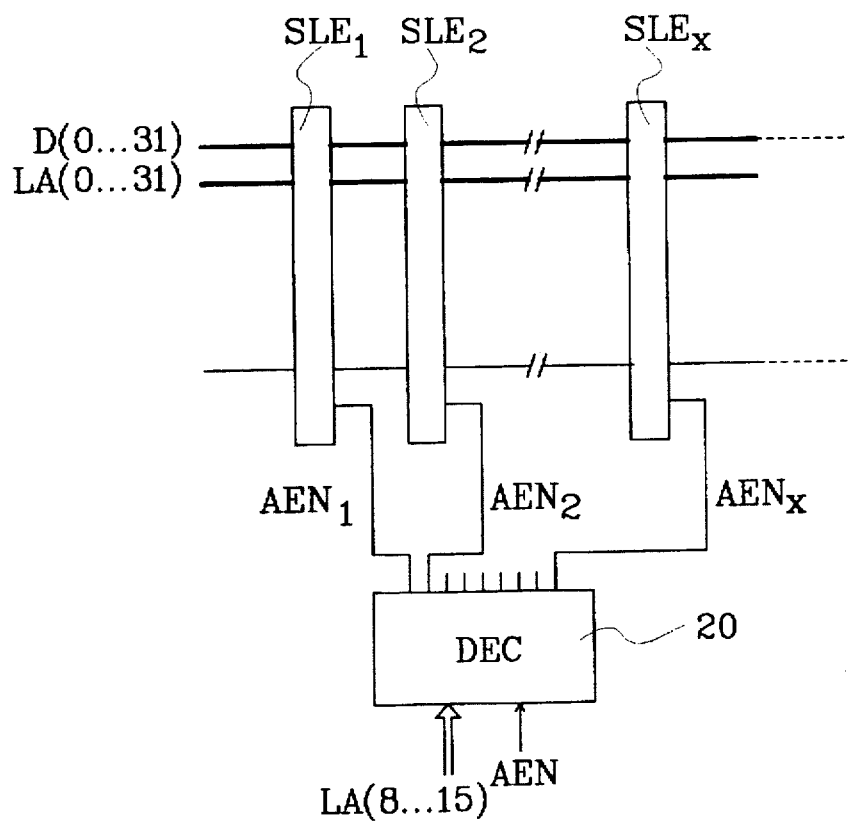
FIG. 2, above described, schematically shows a bus meeting the EISA standards.

In the ISA bus, at most 16 data lines are available. Thus, with the configurations of FIGS. 3 and 4, at most 15 slots SL can be provided since one of the lines is used to establish signal LOCK. Of course, the invention can also be adapted to an EISA bus. For this purpose, it simply is sufficient to provide each gate A$_i$ with the signal AEN$_i$ supplied by the decoder 20 of FIG. 2 instead of with signal AEN. Register 30 can then be a 32-bit register whose states are fixed by the 32 data lines D of the EISA bus, which allows to select up to 31 slots.

The invention can also be advantageously used with a microcomputer POST program, which, at a specific action of an operator, will send the information gathered by the program to a printer.

The action of the operator can be, for example, writing a specific sequence of keys on a keyboard as he powers the computer on. It is also possible to provide an additional switch close to the power switch; the operator then simultaneously handles both switches when he desires to print the gathered information.

This information can be conventional information, such as the size of the system memory available on the microcomputer, the nature of the installed extension cards, the releases of the various programs monitoring the computer (BIOS, video BIOS) stored in the ROM's, the content of files determining how the computer must be configured, and so forth, as well as the slot numbers of the installed cards and of the cards disabled because of possible address collisions.

This information can prove very useful to a serviceman who will be able to determine whether there is really a failure or whether the computer is suitably configured to use the installed hardware. In fact, most of the failures are due to a wrong configuration.

The invention has been described with three alternatives for disabling a slot, that is, disabling access to peripheral devices and disabling the read mode of the system memory below 1 Mb, and beyond 1 Mb. Of course, those skilled in the art will be able to select only one of the disabling possibilities.

As is apparent to those skilled in the art, various modifications can be made to the above preferred embodiments. More particularly, NAND gates can be substituted to gates A and S, the enabling signals SEN being then active when they are at 1. Similarly, the function of gates M and of the switch devices K can be realized by many combinations of logic circuits.

I claim:

1. A data processing system for receiving and interworking with ISA extension cards for interfacing with a standard ISA bus, the extension cards including peripheral device means and memory with respective addresses, said data processing system including:

an ISA-based bus having address, data and control lines, said control lines including a first line for signals controlling access to said peripheral device means and a second line for signals enabling a memory read mode for reading said memory;

a plurality of slots for receiving ISA extension cards, at least some of said address, data and control lines being connected in parallel to said slots;

conflict testing means connected to said bus; and selection means connected to said conflict testing means and operatively interposed between said slots and said first and second control lines for selectively controlling, under the control of said conflict testing means, transmission of said access controlling signals from said first and second lines to said slots, said conflict testing means comprising:

(a) selection control means for controlling said selection means during a test phase such that each slot in turn receives, during a corresponding test period, said access controlling signals from the first and second control lines to enable the peripheral device means and memory of any extension card present in that slot to be accessed over said bus during the corresponding test period, the other of said slots being supplied during this test period with signals from said selecting means inhibiting access to the peripheral device means and memory of any said extension cards present in said other slots, (b) address determining means for supplying further signals to the bus during each test period to ascertain the addresses of the peripheral device means and memory of the extension card, if any, present in the slot to which the further signals of the first and second control lines are currently being coupled, the address-determining means storing these addresses with an identifier of the slot concerned, and (c) conflict-determining means for comparing the addresses stored for each slot by said address-determining means and determining the presence of any conflicts, the conflict-determining means including output means for generating an output signal dependent on any conflicts found.

2. The data processing system of claim 1, wherein said output signal identifies slots to be disabled to eliminate said conflicts, said selection means being programmable by said output signal to supply to each slot identified by said output signal, additional signals for inhibiting access to the peripheral device means and memory of the corresponding extension card, while permitting the signals on the first and second control lines to be supplied to another of said slots.

3. The data processing system of claim 2, wherein said selection means, after being programmed by said output signal, is locked and can only be changed upon resetting of said system to an initial condition state.

4. The data processing system of claim 1, further including an output device for providing a user-readable output, said output signal identifying the slots involved in said conflicts and being supplied to said output device to inform a user of the identity of the slots with conflicting extension cards.

5. The system of claim 1, wherein said selection means includes:

a register programmable by said selection control means and including a respective output for each of said slots; and for each of said slots:

(a) a first logic gate having a first input connected to be responsive to a signal on said first control line, a second input connected to be responsive to a signal in the register derived at an output of the register associated with the slot, and an output connected to said slot, and (b) a second logic gate having a first input connected to be responsive to a signal on said second control line, a second input connected to be responsive to a signal derived at an output of the register associated with the slot, and an output connected to said slot.

6. The system of claim 1, wherein each of said slots has a respective slot-specific bus master line connected thereto, the bus master line being switchable between inactive and active states by one of said extension cards received in the slot for enabling the extension card to become a bus master and take control of said bus, said control lines further including a third line for third signals enabling a further memory read mode, the third line being bidirectional enabling it to be used both for controlling memory read from an extension card and, when that card is acting as a bus master, for enabling the extension card to control memory read in said further memory read mode; said selection means being operatively interposed between said third line and said slots and being responsive to said slot-specific bus master lines such that:

(a) when the slot-specific bus master line associated with one of said slots is inactive, the transmission of said third signals on said third line to the slot is controlled in the same manner as for the transmission of the signals on the first and second control lines to the same slot, and (b) when the slot-specific bus master line associated with one of said slots is active, the third line is connected directly to the slot.

* * * * *